United States Patent
Müller et al.

(10) Patent No.: US 10,795,487 B2
(45) Date of Patent: Oct. 6, 2020

(54) TOUCH-SENSITIVE CONTROL DEVICE FOR A MOTOR VEHICLE AND METHOD FOR OPERATING A TOUCH-SENSITIVE CONTROL DEVICE

(71) Applicant: AUDI AG, Ingolstadt (DE)

(72) Inventors: Ulrich Müller, Ingolstadt (DE); Michael Stützel, Pfaffenhofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/494,839

(22) PCT Filed: Mar. 2, 2018

(86) PCT No.: PCT/EP2018/055128
§ 371 (c)(1),
(2) Date: Sep. 17, 2019

(87) PCT Pub. No.: WO2018/177679
PCT Pub. Date: Oct. 4, 2018

(65) Prior Publication Data
US 2020/0081601 A1  Mar. 12, 2020

(30) Foreign Application Priority Data

Mar. 31, 2017  (DE) .................. 10 2017 205 494

(51) Int. Cl.
*G06F 3/041* (2006.01)

(52) U.S. Cl.
CPC .......... *G06F 3/0414* (2013.01); *G06F 3/0418* (2013.01); *G06F 3/04144* (2019.05); *B60K 2370/143* (2019.05); *B60K 2370/199* (2019.05)

(58) Field of Classification Search
CPC .... G06F 3/044; G06F 3/0414; G06F 3/04144; G06F 3/0418; B60K 2370/143; B60K 2370/199
See application file for complete search history.

(56) References Cited

U.S. PATENT DOCUMENTS

2011/0012869 A1* 1/2011 Klinghult .............. G06F 1/3203
345/178
2011/0050563 A1  3/2011 Skutt
(Continued)

FOREIGN PATENT DOCUMENTS

DE   102011089894 A1   6/2013
DE   102013227090 A1   9/2014
(Continued)

OTHER PUBLICATIONS

International Preliminary Report on Patentability (Chapter I) dated Oct. 10, 2019, in corresponding International application No. PCT/EP2018/055128; 10 pages.
(Continued)

*Primary Examiner* — Robert J Michaud
(74) *Attorney, Agent, or Firm* — Maier & Maier, PLLC

(57) ABSTRACT

A touch-sensitive control device for a motor vehicle, with a control surface; a detection unit which is configured to detect a space-resolved deflection of the control surface; a control unit which is configured to distinguish a characteristic of a deflection of the control surface due to a force exerted on the control surface purely with at least one finger from a characteristic of a deflection of the control surface due to an acceleration acting on the entire control surface. On the basis of this, the force exerted on the control surface purely with the finger, as well as to trigger a function as a function of the determined force exerted purely with the finger is determined.

5 Claims, 2 Drawing Sheets

(56) References Cited

U.S. PATENT DOCUMENTS

2017/0017346 A1     1/2017   Gowreesunker et al.
2017/0153737 A1     6/2017   Chawda et al.
2017/0357361 A1*   12/2017   Hong .................... G06F 3/0416

FOREIGN PATENT DOCUMENTS

| DE | 102013021875 A1 | 6/2015 |
| DE | 102015200240 A1 | 7/2015 |
| DE | 102014017377 A1 | 6/2016 |
| EP | 2492786 A1 | 8/2012 |
| EP | 3 147 765 A1 | 3/2017 |

OTHER PUBLICATIONS

German Examination Report dated Jun. 27, 2019 in corresponding German Application No. 102017205494.8; 16 pages.
International Search Report and Written Opinion dated May 24, 2018 in corresponding International Application No. PCT/EP2018/055128; 28 pages.

* cited by examiner

TOUCH-SENSITIVE CONTROL DEVICE FOR A MOTOR VEHICLE AND METHOD FOR OPERATING A TOUCH-SENSITIVE CONTROL DEVICE

FIELD

The disclosure relates to a touch-sensitive control device for a motor vehicle, to a method for operating a touch-sensitive control device and to a motor vehicle with such a touch-sensitive control device.

BACKGROUND

Vehicle systems are commonly controlled via touchscreens. In some applications, the force of touching or actuation of touchscreens is evaluated additionally. Here, the force exerted perpendicularly to the touchscreen is usually measured. I.e., it is measured how strongly a user presses on the touchscreen. Thereby, in connection with an actuator, a force feedback, that is to say a type of tactile feedback, can be generated additionally inter alia, feedback which produces the sensation of a mechanical key. In addition, in connection with the measurement, on the basis of not only a pure touch control but also a force control, different interaction levels for controlling vehicle systems can be generated.

In motor vehicles, in particular during a trip, forces applied to touchscreens by vehicle occupants may be superposed by accelerations of the vehicle and vibrations of the vehicle. For example, if a motor vehicle is braked strongly or drives over a bump, then a force applied to the touchscreen by a vehicle occupant can be strongly superposed by the acceleration forces acting on the touchscreen. In the case of an acceleration of the motor vehicle, for example, of 1 G, resulting, for example, from driving over a bump, a force of 7.5 newtons acts on a display weighing 750 g. However, a typical force that has to be exerted by a user on such a display in order to trigger a function is usually only 2.5 newtons. In order to be able to nonetheless reliably measure the force applied by the user in such situations, acceleration sensors arranged outside of such touchscreens are commonly installed. All the measured values of a force sensor system on the touchscreen are corrected using the acceleration values measured by means of the acceleration sensor. It is disadvantageous that such an acceleration sensor is a relatively expensive component. In addition, a rapid and relatively high computation power is necessary in order to correct the measured force values in real time. Long-term problems can exist, since the force measurement occurs in parallel but independently of the acceleration measurement.

DE 10 2013 227 090 A1 discloses a method for compensating for a deformation of a touch-sensitive control field. Here, an offset of a capacitive sensor device is determined and used to compensate for the deformation of the control field for the recognition of a touch-screen input.

DE 10 2015 200 240 A1 describes a temperature-compensating force sensor for a Smartphone with a touch-sensitive surface. Thereby, the influence of the temperature during a detection of a force exertion on the touch-sensitive surface can be compensated.

EP 2 492 786 A1 describes a control element with a force measuring device. Between a cover plate of the control element and the force measuring device, an air gap is provided. As soon as the cover plate is exposed to a force, the cover plate is moved relative to a housing frame. The force measuring device can here measure the force exerted.

SUMMARY

The present invention is to enable a particularly simple and reliable measurement of a force applied by a vehicle occupant to a touch-sensitive control device.

This problem is solved by a touch-sensitive control device for a motor vehicle and by a method for operating a touch-sensitive control device.

The touch-sensitive control device for a motor vehicle according to the disclosure comprises a control surface and a detection unit which is configured to detect a space-resolved deflection of the control surface. Moreover, the touch-sensitive control device comprises a control unit which is configured to distinguish a characteristic of a deflection of the control surface due to a force exerted on the control surface purely with at least one finger from a characteristic of a deflection of the control surface due to an acceleration acting on the entire control surface and, on the basis of this, to determine the force exerted on the control surface purely with the finger, and to trigger a function as a function of the determined force exerted purely with the finger.

The touch-sensitive control device can be, for example, a touchscreen or else a touchpad. The control surface can, for example, be a glass plate or else a plastic plate. In the case of a touchscreen, for example, between the control surface formed by glass and a display, an air gap is also provided, so that the control surface can bend slightly when a force is applied and/or move in the direction of the display. In the case of a touchpad, on the other hand, the control surface has to be nontransparent. To the extent that it is advantageous for haptic reasons, the control surface can also be made of glass in this case.

Deflection of the control surface is understood to mean both a bending and also a movement of the control surface. The detection unit is thus configured to measure both a break in the control surface and also a movement of the entire control surface as such. Space-resolved deflection is understood to mean that for a plurality of sites of the control surface, the respective deflection, for example, with respect to a certain reference plane, can be determined. Thus, for different coordinates of the control surface, respective values with regard to the deflection are available.

The disclosure is based on the finding that the deflection behavior of the control surface is dependent on a force distribution acting on the control surface. Thus, when a force is exerted on an isolated point of the control surface, the control surface is only partially bent at an isolated point. This behavior will thus be exhibited when the control surface is actuated with a finger. On the other hand, if an acceleration force acts on the entire control surface, for example, because the motor vehicle drives over a bump during a trip or when a particularly strong braking process is carried out, then the control surface is deflected over a large area.

Because the control unit is configured to distinguish a characteristic of a deflection of the control surface due to a force exerted on the control surface purely with at least one finger from a characteristic of a deflection of the control surface due to an acceleration acting on the entire control surface, the force that a vehicle occupant actually exerts on the control surface can be detected in a particularly reliable manner and evaluated separately. In other words, the control unit can thus determine a force value from which acceleration values have been removed. A separate acceleration sensor can thus be dispensed with. Indeed, the force computation occurs jointly with a type of indirect acceleration computation via the evaluation of the space-resolved deflection of the control surface, so that the runtime problems mentioned at the beginning are considerably reduced or no longer occur at all.

An advantageous embodiment of the disclosure provides that the control unit is configured to compare the force exerted with the finger with a threshold value and to trigger the function only if the threshold value is exceeded. The triggering of the function can then consist in that a feedback which can be detected by a tactilely detectable feedback is output on the control surface, for example, in that the control unit actuates an actuator configured correspondingly for this purpose, which makes the control surface vibrate as soon as the force exerted with the finger exceeds the mentioned threshold value. Because the force actually exerted on the control surface by a user can be detected in a particularly exact and reliable manner, the function triggering can also occur in a particularly exact manner. Accidental erroneous triggerings of functions by inaccurate detection of the force actually applied to the control surface by a user are thus highly unlikely. In particular, a force feedback function that works particularly reliably can be implemented thereby, so that, when the touch-sensitive control device is actuated, the user can be given the impression of actuating a mechanical key.

An additional advantageous embodiment of the disclosure provides that, between the control surface and a support, an air gap is present, wherein the detection unit comprises tracks that are arranged on respective sides of the control surface and of the support facing the air gap and that are used for the capacitive detection of the space-resolved deflection of the control surface. The bending which occurs when force is applied to the control surface or the movement of the control surface in the direction of the tracks can be measured in a particularly reliable manner by means of the tracks acting as a type of capacitor. When a force is applied onto the surface of the control surface, said control surface is deformed, so that the distance between the tracks decreases. This can be measured in the form of a change in capacitance.

According to an additional advantageous embodiment of the disclosure, it is provided that the control unit is configured to determine, based on the capacitive detection of the space-resolved deflection of the control surface, a force distribution acting on the control surface. The bending and movement of the control surface which are detected capacitively can thus be converted into a force distribution. The control unit can carry out a kind of pattern recognition based on the existing force distribution, so that a force applied to an isolated point and a force distribution acting over a plane due to an acceleration of the entire control surface can be easily distinguished. The value of the acceleration can be determined from the magnitude and the distribution of the force. In addition, two or optionally multiple point forces can also be recognized, for example, when a user operates the control surface with several fingers. Independently of whether the space-resolved deflection is evaluated as such or is first converted into a force distribution and then evaluated, different characteristic space-resolved deflections of the control surface or characteristic force distributions can be stored within the control unit, for example, so that a force exerted on the control surface by means of a finger can be computed taking into consideration an acceleration acting possibly at the same time on the control surface.

The motor vehicle according to the disclosure comprises the touch-sensitive control device according to the invention or an advantageous embodiment of the touch-sensitive control device.

In the method according to the disclosure for operating a touch-sensitive control device of a motor vehicle, by means of a detection unit, a space-resolved deflection of a control surface is detected. By means of a control unit, a characteristic of a deflection of the control surface due to a force exerted on the control surface purely with at least one finger is distinguished from a characteristic of a deflection of the control surface due to an acceleration acting on the entire control surface. On the basis of this, the force exerted on the control surface purely with the finger is determined, and a function is triggered as a function of the determined force exerted purely with the finger. Advantageous embodiments of the touch-sensitive control device according to the invention are to be considered advantageous embodiments of the method according to the disclosure and conversely, wherein the touch-sensitive control device comprises in particular means for carrying out the method steps.

DETAILED DESCRIPTION

Figure 1:
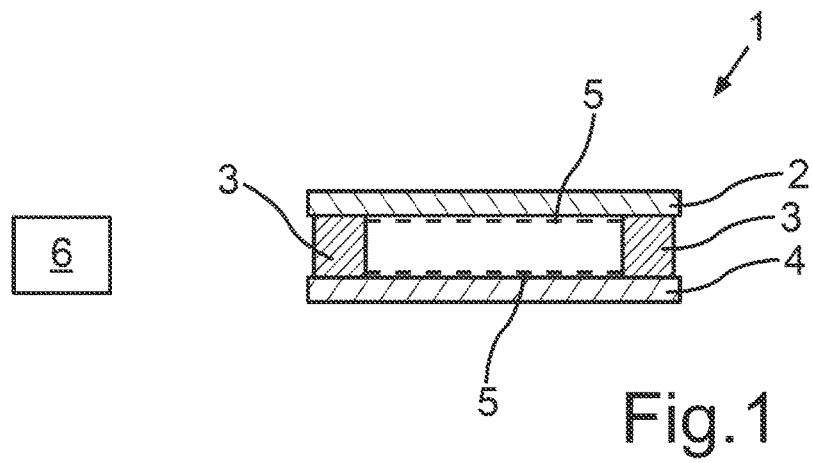
FIG. 1 shows a diagrammatic representation of a touch-sensitive control device for a motor vehicle, which comprises a control surface which is mounted spaced apart from a support, wherein respective tracks that are arranged on the lower side of the control surface and on the upper side of the support form a capacitive detection unit, by means of which a deflection of the control surface can be detected.

In the figures, identical or functionally equivalent elements are provided with identical reference numerals.

The touch-sensitive control device 1 for a vehicle, not represented in further detail, is shown in FIG. 1. The touch-sensitive control device 1 can be, for example, a touchscreen or else a touchpad. The touch-sensitive control device 1 can be arranged, for example, in the area of a center console or else in any other desired position in a vehicle interior of the motor vehicle. By touching and applying a force to the control device 1, a vehicle occupant can control vehicle functions of a wide variety of vehicle functions.

The control device 1 comprises a control surface 2 which is mounted via elastomer bearings 3 on a support 4. The control surface 2 for this purpose can be designed to detect touching, for example, capacitively. Between the control surface 2 and the support 4, an air gap not shown in further detail is located. The touch-sensitive control device 1 comprises respective tracks 5 arranged on respective sides of the control surface 2 and of the support 4 facing the air gap and are used for the capacitive detection of a space-resolved deflection of the control surface 2. Moreover, the touch-sensitive control device 1 also comprises a control unit 6, the mode of operation of which is discussed in more precise detail below.

Figure 2:
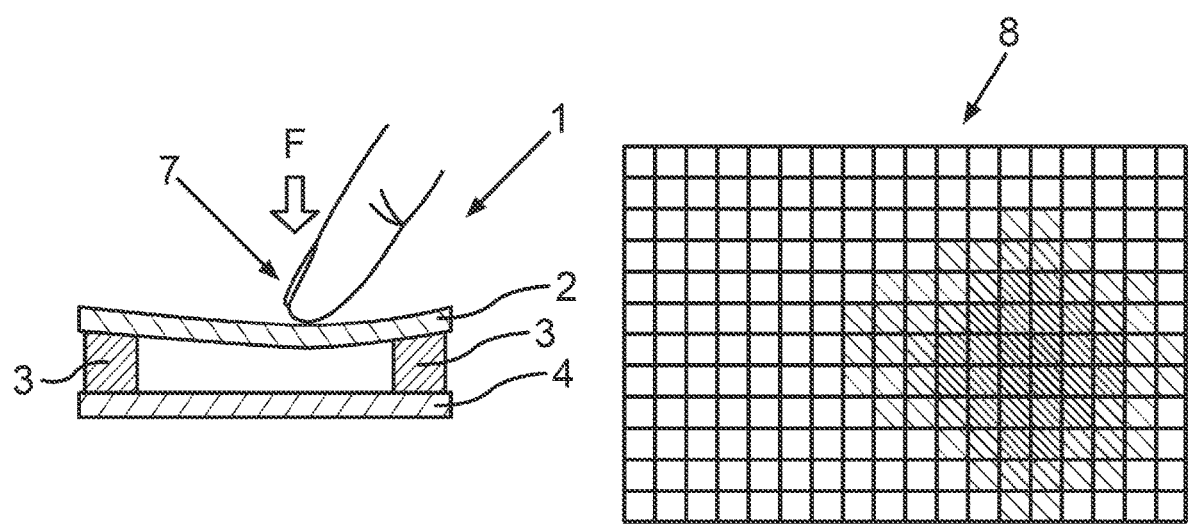
FIG. 2 shows a diagrammatic representation of a touch-sensitive control device while the control surface is depressed with a finger, wherein a force distribution resulting from the actuation is represented diagrammatically.

In FIG. 2, the control device 1 is represented diagrammatically while a vehicle occupant exerts a force F on the control surface 2 with his/her finger 7. Due to the force F applied by the vehicle occupant, the control surface 2 is bent in the direction of the support 4. Since the control surface 2 is mounted on the support 4 via the elastomer bearings 3, it can occur, in addition, that the control surface 2 is not only bent but also moved as a whole in the direction of the support 4. The distance between the tracks 5, not represented in further detail here, is thus reduced to varying degrees by the force application. The detection unit formed by the tracks 5 can thereby capacitively detect a space-resolved deflection of the control surface 2.

Control unit 6 is configured in order to determine, based on the capacitive detection of the space-resolved deflection of the control surface 2, a force distribution 8 acting on the control surface 2, as represented diagrammatically to the right of the touch-sensitive control device 1.

Figure 3:
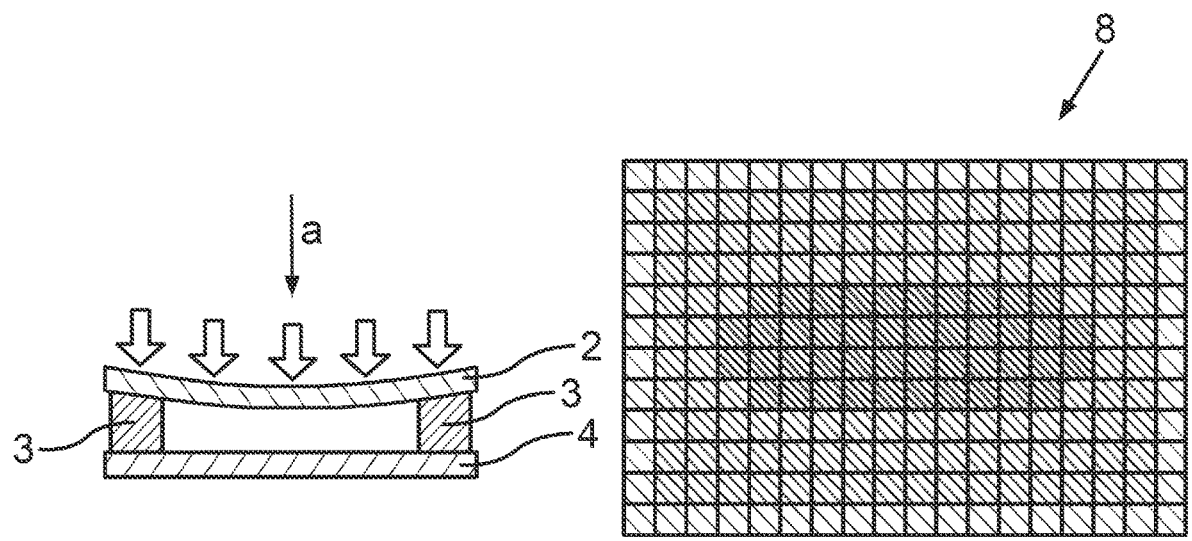
FIG. 3 shows a diagrammatic representation of the touch-sensitive control device while the control surface is deflected due to an acceleration acting on the entire control surface, wherein a force distribution resulting from the acceleration of the control surface is represented diagrammatically.

In FIG. 3, the control device 1 is again represented diagrammatically, wherein, in the case shown here, only a deflection of the control surface 2 due to an acceleration a acting on the entire control surface 2 occurs. As can be seen, the control surface 2 is bent in the direction of the support 4 due to the acceleration a, wherein it can occur, in addition, that the elastomer bearings 3 are slightly buckled, as a result of which the control surface 2 in turn is moved as a whole in the direction of the support 4. Thus, even without a force application by a vehicle occupant, it can occur that the control surface 2 is bent and moved, that is to say deflected. In contrast to a point-shaped force application at an isolated point, the control surface 2 is bent less. The distance between the tracks 5, not represented in further detail here, is again reduced to varying degrees. As a result, the detection unit formed by the tracks 5 can again detect a space-resolved deflection of the control surface 2 as occurs due to the acceleration a.

The control unit 6 is again configured to determine, based on the capacitive detection of the space-resolved deflection of the control surface 2, a force distribution 8 acting on the control surface 2, as represented diagrammatically to the right of the touch-sensitive control device 1.

It can certainly occur that a user presses on the control surface 2 with his/her finger 7, for example, in order to trigger a certain function of the motor vehicle, wherein, at the same time, a bump is driven over by the motor vehicle, as a result of which an acceleration acts in perpendicular direction on the entire control surface 2. The control unit 6 is configured to distinguish a characteristic of a deflection of the control surface 2 due to a force F exerted on the control surface 2 purely with the finger 7 from a characteristic of a deflection of the control surface 2 due to an acceleration a acting on the entire control surface 2 and, on the basis of this, to determine the force F exerted on the control surface 2 purely with the finger 7.

For this purpose, by a type of pattern recognition, the control unit 6 can distinguish from one another the different force distributions 8 resulting from a manual application of force on the control surface 2 and those due to an acceleration of the control surface 2 as a whole. Alternatively, it is also possible that the control unit 6 can directly analyze and evaluate, instead of the force distributions 8, a space-resolved deflection of the control surface 2 in order to distinguish which portion of the deflection results from a force F applied with the finger 7 and which portion results from an acceleration a of the entire control surface 2.

By means of the control unit 6, it is thus possible to analyze the capacitively detected space-resolved deflection of the control surface 2 in order to determine the force F applied purely with the finger 7. In the control unit 6 or else in a memory not represented in further detail, for example, data can be stored, which describes different characteristics of space-resolved deflections of the control surface 2 and/or different characteristics of the force distributions 8 and, in particular, depending on how and whether the control surface 2 is exposed to a force F at an isolated point or is deflected by an acceleration acting on the entire control surface 2.

Figure 4:
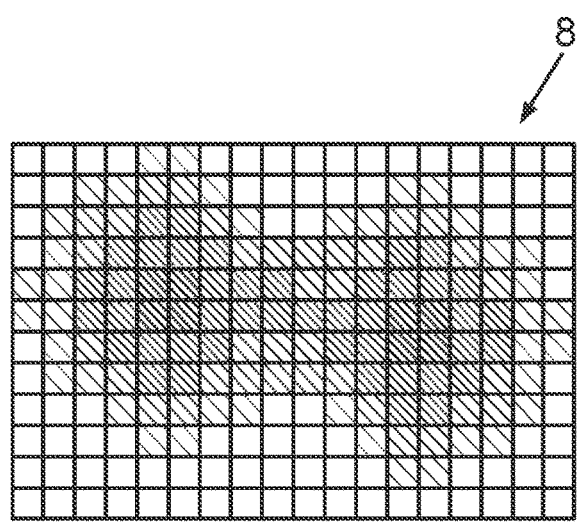
FIG. 4 shows a diagrammatic representation of a force distribution on the control surface which results from an actuation of the control surface with two fingers.

In FIG. 4, an additional force distribution 8 is represented diagrammatically, wherein this force distribution 8 results when a vehicle occupant presses on the control surface 2 with two fingers 7. The control unit 6 can also evaluate such a force distribution 8 or such a space-resolved deflection of the control surface 2 resulting from such a force exertion and distinguish it from a deflection caused due to an acceleration a acting on the control surface 2 as a whole.

By means of the touch-sensitive control device 1, it is thus possible to determine force values F with which a vehicle occupant actually presses on the control surface 2, from which accelerations a have been removed. Inter alia, this makes it possible, in a particularly exact manner, to output a tactilely detectable feedback which can be detected by tactile means on the control surface 2, for example, by means of an actuator coupled to the control surface 2, as soon as a vehicle occupant has pressed firmly enough on the control surface 2 with his/her finger 7.

The force F exerted purely with the finger 7 which can be detected by means of the control unit 6 can be compared, for example, with a predetermined threshold value, wherein the tactilely detectable feedback which can be detected by tactile means is output on the control surface 2 only if the threshold value is exceeded.

In addition, it is also possible for the control unit 6 to bring about the triggering of a wide variety of functions of the motor vehicle as soon as a vehicle occupant has pressed sufficiently firmly on the control surface 2 with his/her finger 7. Because the force F exerted on the control surface 2 by a vehicle occupant can at all times be measured in an exact manner independently of the acceleration of the motor vehicle, erroneous triggerings of functions can be prevented particularly reliably.

The invention claimed is:

1. A touch-sensitive control device for a motor vehicle, comprising:
   a control surface mounted via elastomer bearings on a support;
   an air gap present between the control surface and the support;
   a detection unit having tracks that are arranged on respective sides of the control surface and of the support facing the air gap, the tracks being used for the capacitive detection of a space-resolved deflection of the control surface; and
   a control unit;
   wherein, when a force is exerted on an isolated point of the control surface, the control surface bends at the isolated point;
   wherein, when an acceleration force acts on the entire control surface, the control surface is deflected over a large area; and wherein the control unit determines, based on the capacitive detection of the space-resolved deflection of the control surface, a force distribution acting on the control surface, and distinguishes a deflection of the control surface due to a force exerted on the control surface purely with at least one finger from a deflection of the control surface due to an acceleration acting on the entire control surface and, on the basis of this, determines the force exerted on the control surface purely with the finger, and triggers a function as a function of the determined force exerted purely with the finger.

2. The touch-sensitive control device according to claim 1, wherein the control unit compares the force exerted by the finger with a threshold value and triggers the function only if the threshold value is exceeded.

3. The touch-sensitive control device according to claim 1, wherein the control device is a touchscreen or touchpad.

4. The touch-sensitive control device according to claim 1, wherein the control unit determines, based on the force distribution, the force exerted on the control surface purely with the finger.

5. A method for operating a touch-sensitive control device of a motor vehicle, in which a space-resolved deflection of a control surface is detected by a detection unit, and, by a control unit, a deflection of the control surface due to a force exerted on the control surface purely with at least one finger is distinguished from a deflection of the control surface due to an acceleration acting on the entire control surface, and, on the basis of this, the force exerted on the control surface purely with the finger is determined, and a function is triggered as a function of the determined force exerted purely with the finger;

wherein, if a force is exerted on an isolated point of a control surface, the control surface bends at the isolated point, if an acceleration force acts on the entire control surface, the control surface is deflected over a large area.

* * * * *